United States Patent [19]

Suk

[11] Patent Number: 5,007,549
[45] Date of Patent: Apr. 16, 1991

[54] ELECTRICAL OUTLET BOXES AND COVERS THEREFOR

[75] Inventor: Eugene J. Suk, Pittsburgh, Pa.

[73] Assignee: Industries, Inc., Livingston, N.J.

[21] Appl. No.: 535,290

[22] Filed: Jun. 8, 1990

Related U.S. Application Data

[63] Continuation of Ser. No. 347,180, May 4, 1989, abandoned.

[51] Int. Cl.$^5$ .................................. H02G 3/14
[52] U.S. Cl. ..................... 220/3.8; 220/241; 220/242; 220/324; 174/48
[58] Field of Search ............ 220/3.8, 241, 242, 18, 220/324; 174/3.3

[56] References Cited

U.S. PATENT DOCUMENTS

| | | | |
|---|---|---|---|
| 2,018,905 | 10/1935 | Urban | 220/3.8 |
| 2,024,493 | 12/1935 | Weinrich | 220/324 |
| 2,520,725 | 8/1950 | Judd | 220/3.3 |
| 2,596,236 | 5/1952 | Glosier | 220/3.8 |
| 2,996,566 | 8/1961 | Stas | 174/48 |
| 3,318,476 | 5/1967 | Clark | 220/3.8 |
| 3,837,521 | 9/1974 | Huston et al. | 220/3.8 |
| 4,044,908 | 8/1977 | Dauberger | 220/3.8 |
| 4,054,222 | 10/1977 | Suk | 220/3.8 |
| 4,119,239 | 10/1978 | Anderson | 220/324 |
| 4,220,808 | 9/1980 | Fujita | 174/48 |
| 4,244,484 | 1/1981 | Guritz et al. | 174/48 |
| 4,334,630 | 6/1982 | Bergin | 220/3.8 |
| 4,436,214 | 3/1984 | Henderson | 220/18 |
| 4,733,330 | 3/1988 | Tanaka et al. | 220/3.8 |
| 4,757,158 | 7/1988 | Lentz | 220/3.3 |
| 4,783,577 | 11/1988 | Mohr | 174/48 |

OTHER PUBLICATIONS

Textron Advertisement, Electrical Construction & Maintenance; vol. 76, No. 1, Jan. 1977, p. 113.

Primary Examiner—Stephen Marcus
Assistant Examiner—S. Castellano
Attorney, Agent, or Firm—John N. Bain; Elliot M. Olstein; Raymond J. Lillie

[57] ABSTRACT

An electrical outlet box having a ring portion which is fitted within the outlet box and a cover which has a downwardly depending circular portion which mates with the ring. The downwardly depending circular portion has outwardly extending tabs which fit into grooves in the inner wall of the ring. Each tab has a groove which interlocks and mates with a protrusion extending from a wall of the groove included in the ring. The interlocking provided which enables the cover to be secured to the outlet box as well as enabling the cover to be easily removable from the outlet box. Thus, an outlet box is provided which enables one to remove and replace the cover easily, and also provides for interchangeable covers.

10 Claims, 3 Drawing Sheets

ELECTRICAL OUTLET BOXES AND COVERS THEREFOR

This application is a continuation of application Ser. No. 07/347,180, filed May 4, 1989, now abandoned.

This invention relates to electrical outlet boxes, also known in the art as "floor boxes." More particularly, this invention relates to an electrical outlet box which can accommodate either a metal or a plastic cover.

Electrical outlet boxes, or floor boxes, have conduit means to provide for the passage of wires and cables through the outlet box, and may also include electrical socket means into which a plug may be inserted so as to provide electrical power to machinery or other electrically powered apparatus. The outlet box may also include a cover. The cover has means which may be lifted or removed so that one may gain access to the electrical sockets. The cover may be made of metal or plastic, and is located at the surface of the floor. The cover may be flush with the surface or be resting on top of the surface, such as a carpet or tile surface.

The cover of an electrical outlet box or floor box in many applications has a top portion which is greater than the width or diameter of the floor box, and a downwardly depending lateral surface portion. The lateral surface portion in many cases is adapted to fit within an adjusting ring contained within the outlet box. The adjusting ring may be mounted within the outlet box by means of PVC (polyvinyl chloride) adhesive. The cover, in some cases, may also be screwed or bolted to the adjusting ring.

Electrical outlet boxes of this arrangement, however, are adapted to accommodate either a metal cover, made, for example, of brass or aluminum, or a plastic cover, depending upon the type of application in which the outlet box is to be used.

It is an object of the present invention to provide an electrical outlet box with a cover that may be fitted securely to the outlet box, as well as be easily removable from the outlet box.

It is also an object of the present invention to provide an electrical outlet box which may accommodate a plastic or a metal cover.

In accordance with an aspect of the present invention, there is provided an apparatus for covering an electrical outlet box which comprises a ring which is capable of being fitted within the interior of or around the perimeter of an electrical outlet box. The ring includes an inner wall and an outer wall. The apparatus also includes a cover, which includes a top portion. The top portion has a diameter greater than that of the outlet box and of the ring. The cover also includes a downwardly depending circular portion capable of mating with the ring.

In a preferred embodiment, at least one of the inner wall and the outer wall of the ring includes at least one first groove portion, and the downwardly depending circular portion of the cover includes at least one tab means projecting from the downwardly depending circular portion. The at least one tab means is capable of being received by said at least one first groove portion, and said at least one tab is capable of interlocking with the at least one groove upon rotation of said cover relative to said ring, thereby enabling the downwardly depending circular portion to mate with the ring. Most preferably, the at least one first groove is bounded by at least one wall portion having at least one protruding portion extending from the at least one wall portion.

The at least one tab means may further comprise at least one second groove means which is capable of mating and interlocking with the at least one protruding portion upon rotation of the cover relative to the ring. The at least one first groove means may include a vertical portion, and a horizontal portion contiguous with the vertical portion, wherein one of the vertical or horizontal portions is capable of receiving the at least one tab upon initial insertion of the at least one tab in said at least one first groove means, and the other of said vertical or said horizontal portions receives the tab upon rotation of the cover relative to the ring.

When the ring is fitted within the electrical outlet box, the apparatus may further comprise means for supporting the ring within an electrical outlet box. The support means may comprise at least two clip means, with each of the clip means comprising a groove for receiving the ring, a vertical flange extending upwardly from the groove and a horizontal flange at the top of and extending outwardly from the vertical flange. The horizontal portion extends over the top peripheal portion of the electrical outlet box.

In accordance with another aspect of the present invention, there is provided an apparatus comprising an electrical outlet box portion and a cover for the electrical outlet box portion. The cover has a diameter greater than that of the electrical outlet box. One of the electrical outlet box portion and the cover includes means for containing at least one first groove means, and the other of said electrical outlet box portion and said cover includes at least one tab means capable of mating and interlocking with said at least one groove upon rotation of the cover relative to the electrical outlet box. The at least one groove may be bounded by at least one wall portion, and one of said wall portion and said tab may have at least one protruding portion extending from the wall portion or the tab and the other of the wall portion or the tab may include at least one second groove means, said at least one second groove means capable of interlocking and mating with said at least one protruding portion upon rotation of said cover relative to said electrical outlet box portion.

The electrical outlet box portion may further comprise a ring which is capable of being fitted within the interior or around the perimeter of the electrical outlet box, and may also include one of said at least one first groove means or said at least one tab means.

The cover may further include a downwardly depending circular portion which includes one of said at least one first groove means or said at least one tab means.

The first groove means may include a vertical portion and a horizontal portion as described above. The ring may be fitted within the electrical outlet box portion as described above, and the apparatus may further comprise means for supporting the ring within the outlet box, such as at least two clips as described above. The apparatus may further comprise a stake which is attached to the bottom of the electrical outlet box portion.

The invention will now be described with respect to the drawings, wherein.

Figure 1:
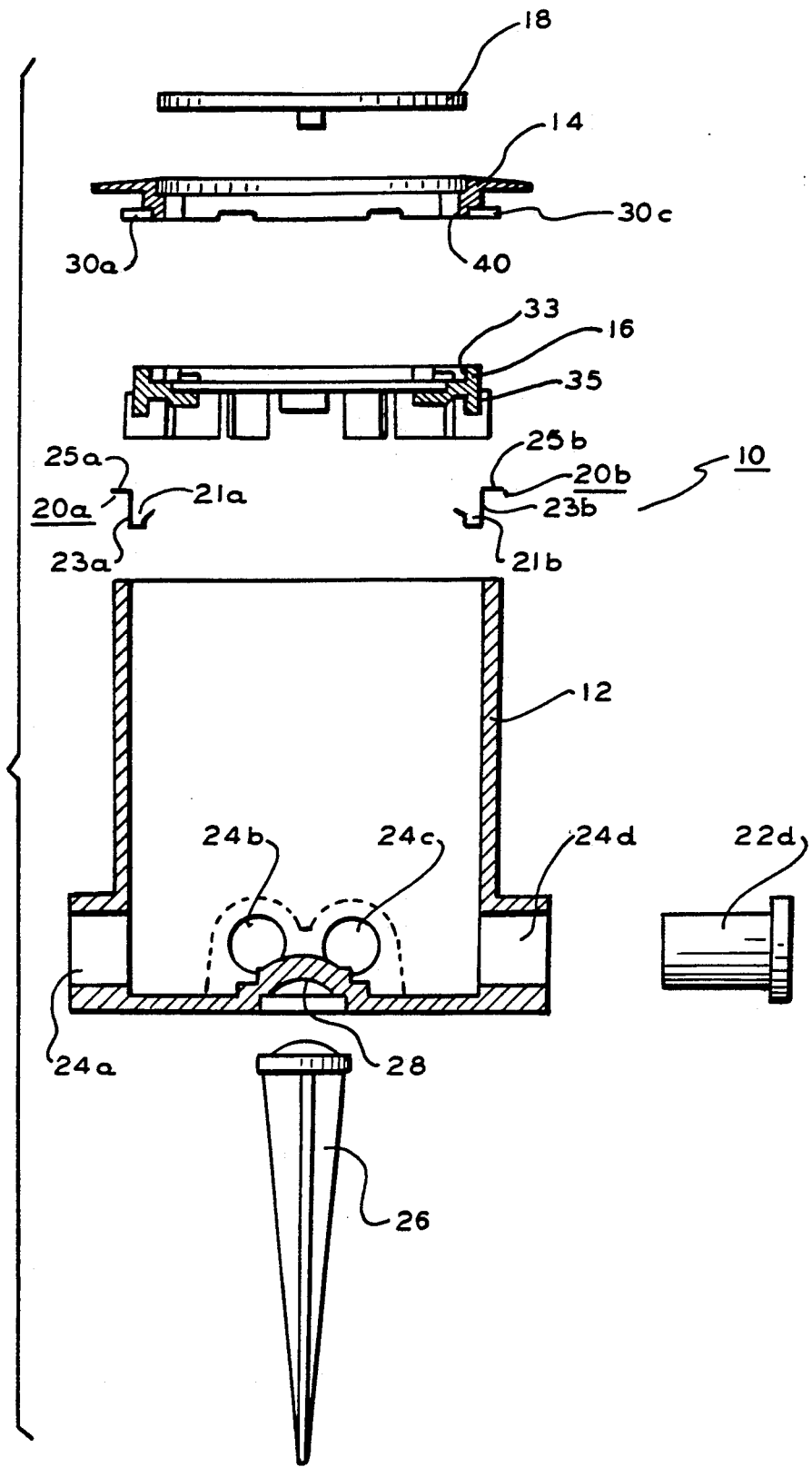
FIG. 1 is an exploded cross-sectional view of an embodiment of an electrical outlet box in accordance with the present invention, said outlet box including a plastic cover.
Figure 2:
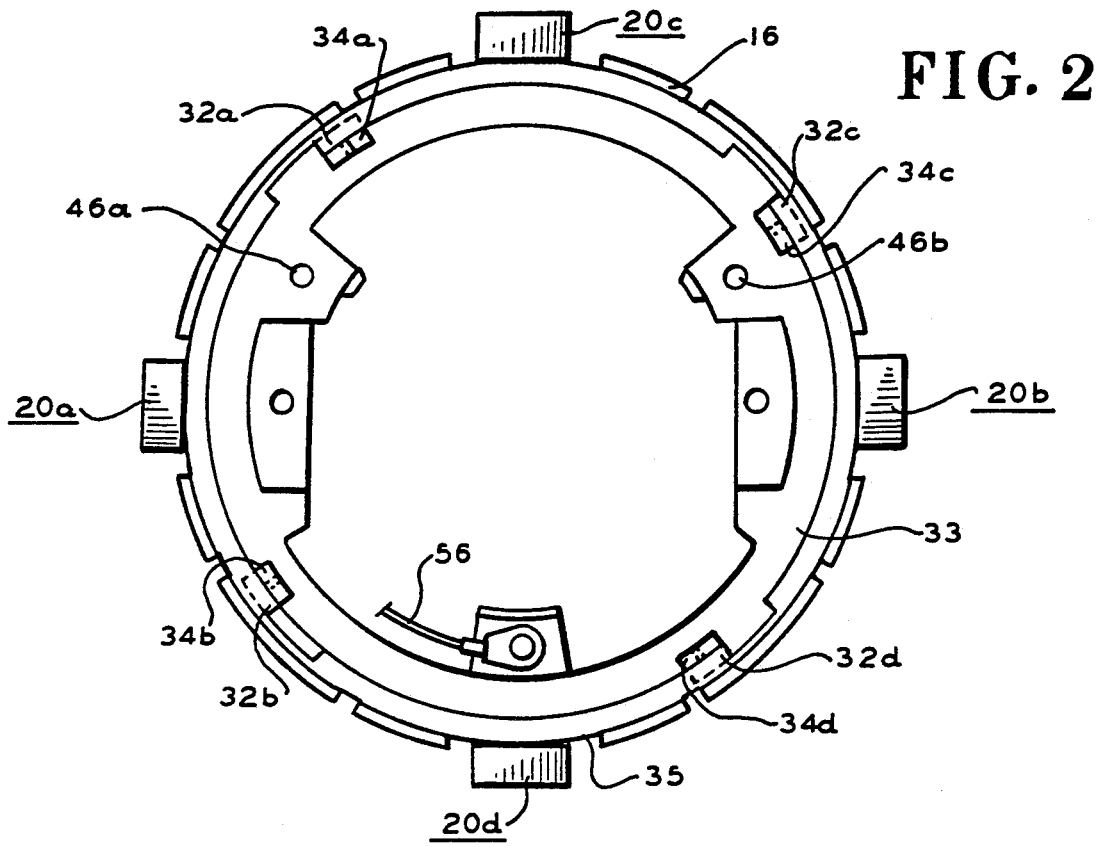
FIG. 2 is a top view of an adjusting ring which is fitted within said electrical outlet box.

Referring now to the drawings, an embodiment of an electrical outlet box 10 of the present invention comprises an outlet box portion 12, an adjusting ring 16 which can be fitted and secured within the outlet box portion 12 with an adhesive such as PVC cement, and in the case when the box 10 is used in connection with a tile floor wherein a cover is flush with a tile floor, may also be supported within the outlet box portion 12 by means of clips 20a, 20b, 20c, and 20d. The outlet box 10 may have a plastic cover 14 having a downwardly depending circular portion 40 from which tabs 30a, 30b, 30c, and 30d extend outwardly. Tabs 30a, 30b, 30c and 30d are adapted to fit within grooves 32a and 34a, 32b and 34b, 32c and 34c, and 32d and 34d, located along the inner wall portion 33 of adjusting ring 16. The plastic cover 14 may surround a socket cover 18 which fits within plastic cover 14. Socket cover 18 covers an electrical socket (not shown) which is fitted within outlet box portion 12.

Located at the bottom of outlet box portion 12 are openings 24a, 24b, 24c, 24d, 24e, and 24f, which accept flexible or rigid conduit means which are held in place by means of PVC adhesive, to accommodate the passage of wires and/or cables through the bottom of outlet box portion 12. If an opening is not employed for the passage of a wire or cable, a cover or plug, such as the one shown as 22d, may be placed within the opening.

Located at the bottom of electrical outlet box 10 is a stake 26, which fits within concavity 28 of outlet box portion 12, and is glued to the outlet box portion 12. Stake 26 enables one to secure more fixedly, the outlet box portion 12 within a floor prior to the addition of flooring materials such as concrete.

The electrical outlet box 10 of the present invention is especially adapted to be placed and fitted within a floor, such as a concrete floor which may be covered with tile or carpet. The electrical outlet box 10 may be fitted within a floor by first gluing stake 26 to the concavity 28 of outlet box portion 12 as described above, and then inserting stake 26 into the ground or flooring material. This serves to fit the outlet box portion 12 within the flooring material. Wires and/or cables may then be passed through any or all of openings or conduits 24a, 24b, 24c, 24d, 24e, or 24f, and plugs may be then be placed over openings not in use. Flooring material such as concrete may then be poured, and the outlet box portion 12 is then cut so as to be flush with the top of the floor. Carpet may then be cut so as to be even with the periphery or inner circumference of outlet box portion 12.

Figure 3:
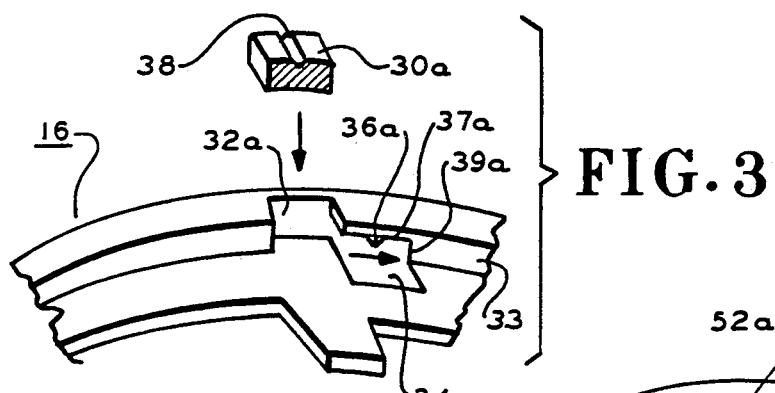
FIG. 3 is a magnified broken-away view of a tab from an electrical box cover which mates with a groove in the interior wall portion of an adjusting ring.
Figure 5:
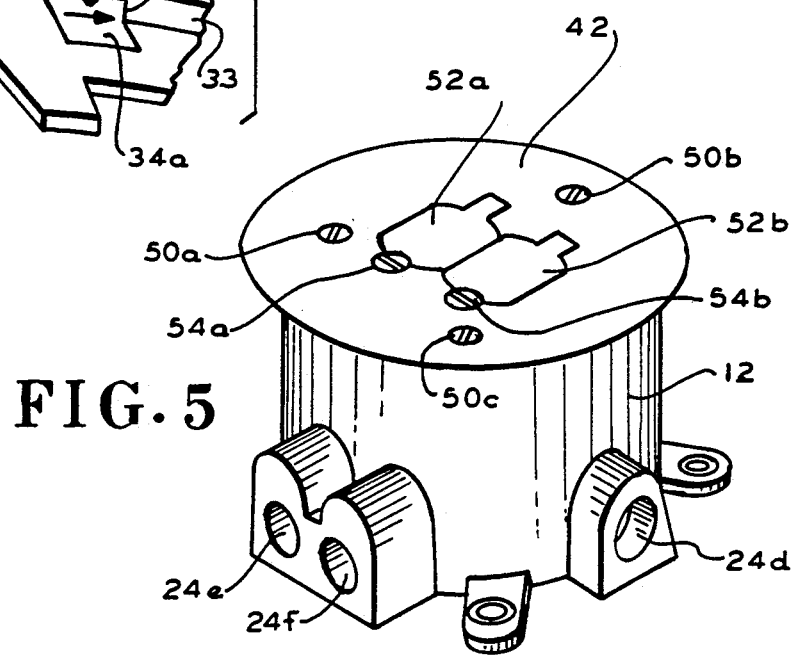
FIG. 5 is an isometric view of an alternative embodiment of said outlet box, said outlet box having a metal cover.
Figure 4:
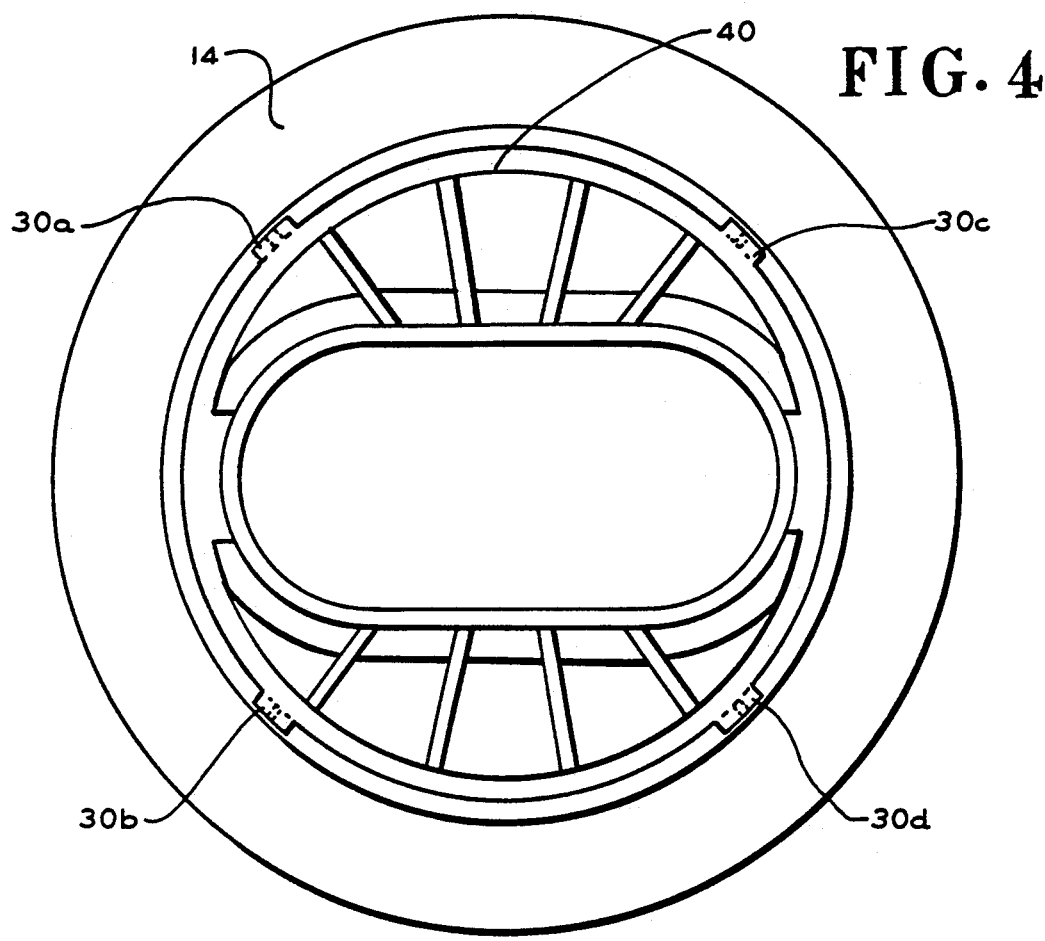
FIG. 4 is a bottom view of a cover for said electrical box, said cover including tabs which mate with the interior wall of said adjusting ring.
Figure 6:
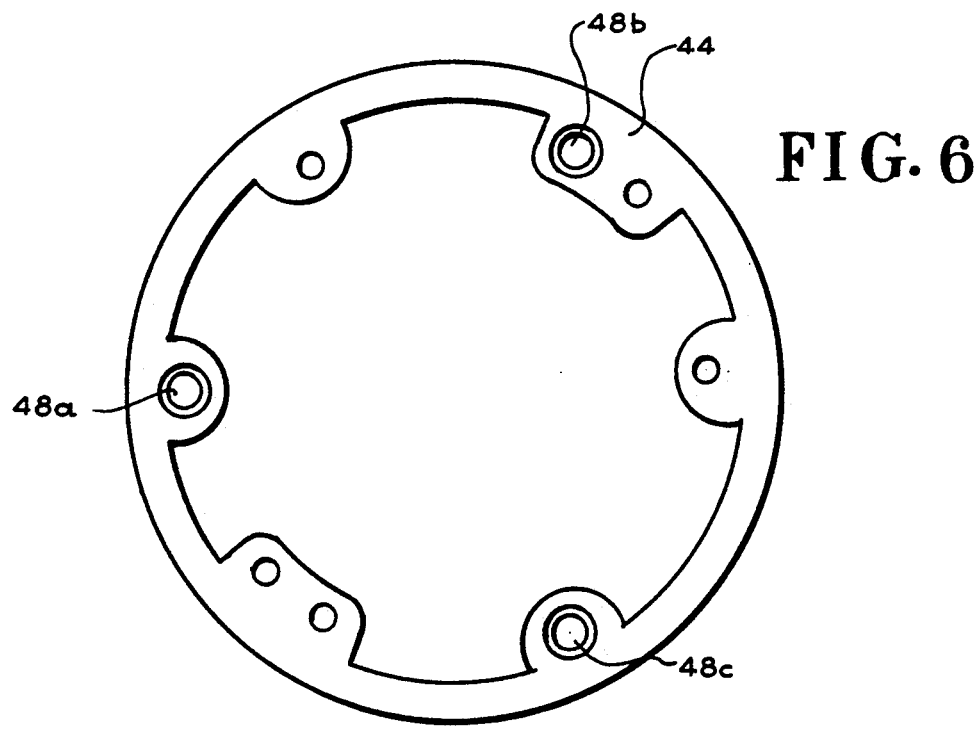
FIG. 6 is a top view of a metal ring which may be connected with said adjusting ring and said metal cover of said outlet box.

After the outlet box portion 12 is cut, plastic cover 14 is then fitted to adjusting ring 16. Each of tabs 30a, 30b, 30c and 30d, which extend outwardly from downwardly depending portion 40 is downwardly inserted into grooves 32a, 32b, 32c and 32d of the inner wall 33 of adjusting ring 16. Each of tabs 30a, 30b, 30c, and 30d has a groove 38 at the top of the tab. In a preferred embodiment, groove 38 is about 1/16 inch wide and about 1/32 inch deep. After the tabs 30a through 30d are inserted into grooves 32a through 32d, respectively, the plastic cover is turned so as to move the tabs 30a, 30b, 30c, and 30d from grooves 32a, 32b, 32c, and 32d into grooves 34a, 34b, 34c, and 34d of inner wall 33. As shown in FIG. 3, groove 34a has an upper wall 37a and a side wall 39a. Extending downwardly from wall 37a is a downwardly depending protrusion 36a. Protrusion 36a, in a preferred embodiment, is about 1/16 inch wide and extends downwardly for about 1/64 inch. As tab 30a is pushed into groove 34a, protrusion 36a interlocks and mates with groove 38 of tab 30a. It is to be understood that tabs 30b, 30c, and 30d are constructed the same as tab 30a, and that grooves 34b, 34c, and 34d are constructed the same as groove 34a. Thus, the interlocking of protrusion 36a with groove 38 enables the plastic cover 14 to be secured effectively to adjusting ring 16.

Groove 38 and protrusion 36a are also constructed such that, in addition to providing an effective means of securing plastic cover 14 to adjusting ring 16, one can turn or twist cover 14 in the direction opposite to that in which cover 14 was turned to secure it to adjusting ring 16, in order to dislodge tabs 30a, 30b, 30c, and 30d from grooves 34a, 34b, 34c, and 34d. The tabs 30a through 30d are then lifted out of grooves 32a through 32d and the cover 14 is removed from adjusting ring 16, thus enabling one to replace cover 14 easily.

Once cover 14 is secured to adjusting ring 16, an adhesive, such as cement, is placed on the outer wall 35 of adjusting ring 16. The adjusting ring is then pushed along the inner wall of the outlet box portion 12 until it stops within outlet box portion 12. The adjusting ring 16 is thus secured to the outlet box portion 12, while cover 14 remains removable from adjusting ring 16. Cover 14 may then be removed from adjusting ring 16 so as to insert and connect electrical fixtures such as sockets (not shown) within outlet box 12. Adjusting ring 16 has a wire 56 attached to aid in any necessary electrical connections.

It will also be noted that plastic cover 14 has a diameter greater than that of outlet box 12. In this manner, cover 14 provides for adequate protection of the interior contents of outlet box 12.

One advantage of the present invention, as noted above, is that plastic cover 14 may be easily removed from adjusting ring 16 as described above and replaced with a metal cover 42. Metal cover 42 may have socket covers 52a and 52b, which are held in place by screws 54a and 54b. Metal cover 42 may be secured to adjusting ring 16 by screws 50a, 50b, and 50c, which are inserted through openings 46a, 46b, and 46c of adjusting ring 16.

If the metal cover 42 needs to be raised slightly in order to fit flush withthe surrounding floor material, as in the case when metal cover 42 is to be fitted flush with a tile floor, a metal ring 44 may be placed within adjusting ring 16, with metal ring 44 abutting against the interior wall portion 33 of adjusting ring 16.

When one desires to have metal cover 42 flush with a tile floor, one fits adjusting ring 16 within clips 20a, 20b, 20c and 20d. As shown in FIG. 1, each of clips 20a and 20b has grooves 21a and 21b for receiving adjusting ring 16, and vertically extending flanges 23a and 23b which extend upwardly to the top of outlet box portion 12. Each of clips 20a and 20b also has a horizontal flange 25a and 25b which extends over the top of outlet box portion 12 and, upon insertion of adjusting ring 16 within outlet box portion 12, will be flush with the top of adjusting ring 16. Clips 20c and 20d, although not shown in FIG. 1, are constructed in the same way as clips 20a and 20b.

Once the adjusting ring is fitted within clips 20a, 20b, 20c, and 20d, an adhesive such as PVC cement is placed on the outer wall 35 of adjusting ring 16, and the adjusting ring 16 is pushed along the inner wall of the outlet box portion 12 until the clips 20a, 20b, 20c, and 20d are stopped by the top of outlet box portion 12. Metal ring 44 is then fitted within the interior wall 33 of adjusting ring 16. Screws 50a, 50b, and 50c are then inserted through holes 48a, 48b and 48c of metal ring 44, and holes 46a, 46b, and 46c of adjusting ring 16 to secure metal cover 42 to the outlet box portion 12. Metal cover 42 is thus fitted flush with the tile.

As with plastic cover 14, metal cover 42 has a diameter wider than that of outlet box portion 12. Metal cover 42 may be easily removed by removing screws 50a, 50b, and 50c from metal cover 42, adjusting ring 16, and/or metal ring 44.

Advantages of the present invention include the ability to secure a plastic cover to an electrical outlet box while effectively protecting the contents of the outlet box, while at the same time one is able to remove said cover easily from the outlet box, thus enabling repair or replacement of the cover. The securing of the plastic cover to the outlet box is accomplished by the interlocking of the tabs of the plastic cover with the grooves of the adjusting ring, and also by the interlocking of the grooves located on each tab with the protrusions from the wall of one of the grooves of the adjusting ring. The grooves of the tabs, as well as the protrusions, are dimensioned such that an effective interlocking of the grooves and protrusions is provided, while also enabling one to unlock the tabs of the cover from the grooves of the adjusting ring and enable one to remove the cover. Thus the plastic cover can be easily removed so that the cover can be repaired or replaced, or so that the parts within the outlet box can be added, repaired, or replaced. The plastic cover may be replaced with a metal cover, which can be fastened to the adjusting ring by means of screws. The metal cover also can be easily removable from the outlet box and may also be easily replaced.

It is to be understood that the scope of the present invention is not to be limited to the specific embodiments described above. The invention may be practiced other than as particularly described and still be within the scope of the accompanying claims.

What is claimed is:

1. An apparatus for covering an electrical outlet box, comprising:

a ring, said ring being capable of being fitted within the interior of said electrical outlet box, said electrical outlet box having a diameter, and said ring including an inner wall and an outer wall, wherein said inner wall includes at least one first groove means, said at least one first groove means being bounded by at least one wall portion, said at least one wall portion having at least one protruding portion extending from said at least one wall portion; and a cover, said cover including a top portion, said top portion having a diameter greater than that of said electrical outlet box and of said ring, and a downwardly depending circular portion, said downwardly depending circular portion including at least one tab means projecting from said downwardly depending circular portion, said at least one tab means including at least one second groove means, said at least one tab means capable of being received by said at least one first groove means, said at least one tab means capable of interlocking with said at least one first groove means and said at least one second groove means capable of mating and interlocking with said at least one protruding portion upon rotation of said cover relative to said ring, thereby enabling said downwardly depending circular portion to mate with said ring.

2. An apparatus for covering an electrical outlet box, comprising:

a ring, said ring being capable of being fitted within the interior of said electrical outlet box, said electrical outlet box having a diameter, said ring including an inner wall and an outer wall;

a cover, said cover including a top portion, said top portion having a diameter greater than that of said electrical outlet box and of said ring, and a downwardly depending circular portion capable of mating with said ring; and means for supporting said ring within said electrical outlet box, said support means comprising at least two clip means, each of said clip means comprising:

a groove for receiving said ring;

a vertical flange extending upwardly from said groove, and a horizontal flange at the top of said vertical flange, said horizontal flange extending outwardly from said vertical flange and extending over the top peripheral portion of said electrical outlet box.

3. An apparatus, comprising:

an electrical outlet box portion, said electrical outlet box portion having a diameter, and said electrical outlet box portion including a ring, said ring being fitted within said electrical outlet portion;

means for supporting said ring within said electrical outlet box portion, said support means comprising at least two clip means, each of said clip means comprising a groove for receiving said ring, a vertical flange extending upwardly from said groove, and a horizontal flange at the top of and extending outwardly from said vertical flange, said horizontal flange extending over the peripheral portion of said electrical outlet box portion, and a cover for said electrical outlet box portion, said cover having a diameter greater than that of said electrical outlet box portion, and said ring including at least one first groove means, and said cover including at least one tab means capable of mating and interlocking with said at least one first groove means upon rotation of said cover relative to said ring.

4. An apparatus, comprising:

an electrical outlet box portion, said electrical outlet box portion having a diameter; and a cover for said electrical outlet box portion, said cover having a diameter greater than that of said electrical outlet box portion said electrical outlet box portion including means for containing at least one first groove means, said at least one first groove means bounded by at least one wall portion, and said cover including at least one tab means, wherein said wall portion has at least one protruding portion extending from said wall portion, and said tab means including at least one second groove means, said at least one tab means capable of mating and interlocking with said at least one first groove means, and said at least one second groove means capable of interlocking and mating with said at least one protruding portion upon rotation of said cover relative to said electrical outlet box portion.

5. The apparatus of claim 1 wherein said at least one first groove means include a vertical portion, and a horizontal portion contiguous with said vertical portion, wherein one of said vertical or said horizontal portions is capable of receiving said at least one tab upon initial insertion of said at least one tab in said at least one first groove means, and the other of said vertical or said horizontal portions receives said tab upon rotation of said cover relative to said ring.

6. The apparatus of claim 3 wherein said cover further includes a downwardly depending circular portion, said downwardly depending circular portion including said at least one tab means.

7. The apparatus of claim 3 wherein said at least one first groove means includes a vertical portion and a horizontal portion contiguous with said vertical portion, wherein one of said vertical or said horizontal portions is capable of receiving said at least one tab upon initial insertion of said at least one tab in said at least one first groove means, and the other of said vertical or said horizontal portions receives said tab upon rotation of said cover relative to said electrical outlet box.

8. The apparatus of claim 3, and further comprising a stake attached to the bottom of said outlet box portion.

9. The apparatus of claim 4 wherein said electrical outlet box portion further comprises a ring, said ring capable of being fitted within the interior of said electrical outlet box portion, said ring also including said at least one first groove means.

10. The apparatus of claim 4 wherein said at least one first groove means includes a vertical portion and a horizontal portion contiguous with said vertical portion, wherein said vertical portion is capable of receiving said at least one tab means upon initial insertion of said at least one tab means in said at least one first groove means, and said horizontal portion receives said tab means upon rotation of said cover relative to said electrical outlet box portion.

* * * * *